United States Patent Office 3,649,588
Patented Mar. 14, 1972

3,649,588
TREATMENT OF FINELY DIVIDED PARTICLES
AND PARTICLES SO TREATED
Henry Kinmy Kennedy-Skipton, West Kilbridge, Scotland, assignor to Imperial Chemical Industries Limited, London, England
No Drawing. Filed Apr. 6, 1970, Ser. No. 26,170
Claims priority, application Great Britain, Apr. 11, 1969, 18,658/69
Int. Cl. C08g 51/04
U.S. Cl. 260—37 SB                          7 Claims

ABSTRACT OF THE DISCLOSURE

Treatment of fillers and pigments to render them hydrophobic and non-structure inducing with a low molecular weight organopolysiloxane in presence of an amino compound, at least part of the process being carried out at an elevated temperature and under pressure.

The invention relates to the treatment of finely divided particles and more particularly to the treatment of fillers, pigments and the like, for example, to render them hydrophobic.

Fillers, pigments and the like materials are used in a wide variety of applications for many purposes in which modification of their surface properties is required including, in some cases, the possession of hydrophobic properties. It is also sometimes desired that fillers or pigments should have reactive groups attached thereto in order to render them more suitable for specific applications.

One of the more important uses of certain of such materials is the incorporation thereof in organopolysiloxane elastomer-forming compositions. One undesirable result of the use of many such materials when used as fillers is that they cause structure build-up and in fact they are commonly known as structure-inducing fillers. Compositions containing these can be formed into the desired final shape only within a comparatively short time if the compositions first undergo a period of reworking, the length of which requires to be increased with the age thereof. This is, of course, highly undesirable and numerous methods have been adopted in order to overcome this defect. Included among such methods has been the treatment of these fillers, pigments and the like with various organopolysiloxanes. The organopolysiloxanes normally used for this purpose have been the lower molecular weight diorganopolysiloxanes, in many cases the cyclic diorganopolysiloxanes such as, for example, octamethylcyclotetrasiloxane which has been widely used for this purpose. The treatment of fillers, pigments and the like with organopolysiloxanes has been carried out by a wide variety of methods. Thus in one method the organopolysiloxane is injected into the finely divided material and allowed to remain in intimate contact therewith until the organopolysiloxane is intimately dispersed through the bulk mass. In another method the vapour of the organopolysiloxanes is passed through a bed of finely divided solid to maintain the solid in fluidised condition, the temperature being sufficient to prevent condensation of the vapour. Excess organopolysiloxane is thereafter eliminated by passing an inert gas through the solid while maintaining it in fluidised condition. In a further method, a finely divided non-alkaline filler or pigment is rendered hydrophobic by treatment with a dihydrocarbylsiloxane of molecular weight not greater than 500 in the presence of from 0.1 to 500 parts by weight per 10,000 parts thereof of an acid. None of the methods proposed or used is, however, entirely satisfactory, particularly where the treated materials are to be used as constituents of organopolysiloxane elastomer-forming compositions.

According to the present invention a new and improved process for rendering finely divided fillers, pigments and like materials hydrophobic and non-structure inducing when used in organopolysiloxane elastomer-forming compositions comprises intimately admixing said material with an organopolysiloxane of molecular weight not more than 500 in the presence of an amino compound, the process being carried out at least in part at an elevated temperature and at least in part under pressure at an elevated temperature.

Fillers, pigments and like materials which may be used in the process of our invention include, for example, the naturally occuring silicas such as diatomaceous earths and ground quartz, manufactured silicas such as precipitated silicas, silica aerogels, fume silicas, for example, the silicas obtained by burning silicon tetrachloride in the vapour phase to give a finely divided silica, asbestos, fullers earth and talc and pigments such as alumina, red iron oxide, magnesium oxide and titanium dioxide.

Fillers, pigments and like materials are normally of particle size not greater than about $10\mu$ although the advantages of our invention can be obtained when the particle size is larger, for example up to $100\mu$ or more. The materials to be treated are generally of relatively large surface area, for example from 20 to 400 m.$^2$/g., but may be of greater surface area, for example up to 1000 m.$^2$/g. The greatest advantage of our invention is obtained in the case of the fillers and especially the finely divided structure inducing silicas, particularly if intended for use as fillers in organopolysiloxane elastomer-forming compositions since structure build-up does not occur until after considerably longer periods than has been the case with the hitherto available treated fillers. The material being treated may or may not contain adsorbed water but in operating our preferred process the presence of adsorbed water is unnecessary.

Organopolysiloxanes suitable for use in the process of our invention include those of molecular weight not greater than 500 and it is in general preferred to use a cyclic diorganopolysiloxane. The organo groups therein, which may or may not be all alike, may be alkyl, alkenyl, aryl, aralkyl, alkaryl, cycloalkyl or cycloalkenyl groups. Suitable groups include, for example, methyl, ethyl, propyl, phenyl, vinyl allyl cyclopentenyl, cyclohexenyl and cyclohexyl groups. It is, however, generally preferred that they be methyl and/or phenyl with or without a proportion of vinyl groups. An especially preferred siloxane is octamethylcyclotetrasiloxane. Suitable siloxanes include, for example, hexamethylcyclotrisiloxane, octamethylcyclotetrasiloxane, tetramethyltetravinylcyclotetrasiloxane, decamethylcyclopentasiloxane, hexamethyldisiloxane, sym - tetramethyldivinylsiloxane, sym - trimethyltriphenylcyclotrisiloxane, octamethyltrisiloxane, decamethyltetrasiloxane and other linear diorganopolysiloxanes including hydroxy-ended diorganopolysiloxanes such as 1,7 - dihydroxyoctamethyltetrasiloxane, 1,9 - dihydroxydecamethylpentasiloxane and 1,11 - dihydroxyduodecamethylhexasiloxane. Preferred siloxanes are 1,3, 5,7 - tetramethyl - 1,3,5,7 - tetravinylcyclotetrasiloxane, hexamethyldisiloxane, 1,3 - divinyl - 1,1,3,3 - tetramethyldisiloxane and 1,3,5 - trimethyl - 1,3,5 - triphenylcyclotrisiloxane.

The organopolysiloxane may be used in widely varying amounts, for example, from 1 percent upwards by weight of the material being treated. Normally amounts from about 5 to about 20 percent are adequate for fillers having high surface area, for example, greater than about 200 m.$^2$/g.

Amino compounds suitable for use in the process of our invention include ammonia, ammonia generating compounds, for example ammonium carbonate, ammonium hydroxide, ammonium chloride and aliphatic amines of boiling point not greater than 250° C., for example methylamine, dimethylamine, trimethylamine, ethylamine, diethylamine, triethylamine, n-butylamine, sec-butylamine, tert.-butylamine, n-hexylamine, ethylenediamine, hexamethylenediamine and octylamine. In many cases it is preferred that the amino compound be ammonia or an ammonia generating compound. Ammonia is, however, particularly preferred. In many cases, but not always, it is desirable to remove the amino compound after treatment and before use of the treated filler or pigment.

The amino compound may be used in widely varying amount, for example from 0.005 mole to 2.0 moles per 100 grams of the material to be treated, except when the amino compound is ammonia in which case amounts of the order of not less than 0.1 per 100 grams are desirable and may be necessary, and use of greater amounts does not, per se, confer any additional advantages.

When the amino compound is gaseous at ambient temperature, for example ammonia, methylamine, it may be necessary for it to be fed into the treating vessel under pressure to obtain the desirable concentration. Thus the contents of the vessel will be at superatmospheric pressure at ambient temperature. When the amino compound is liquid or solid or is a solution of a gaseous amino compound at ambient temperature, the necessary concentrations can normally be attained without the contents being under an initial pressure but the reaction mixture will generate a superatmospheric pressure at the elevated reaction temperature. It is. of course, essential that reactants can be present in the desired concentration at the operating temperature. The higher this temperature the higher will be the internal pressure.

In our preferred treating process, ammonia, siloxane and filler are mixed together in any convenient manner or order. The mixture may be maintained at a temperature from about 60° to about 300° C. and an ammonia pressure from about 20 to about 500 lb./in.$^2$ for a period of from 1 to 24 hours. Alternatively, the mixture may be maintained for a period of, for example, 8 to 48 hours at 20–60° C. in an ammonia atmosphere, after which it is pressurised with ammonia to a pressure of, for example, 5 to 25 p.s.i. then heated for a period of, for example, 1 to 12 hours at a temperature of from about 100 to about 300° C. In cases where the operating ammonia pressure is equivalent to under about 20 lb./in.$^2$ at temperatures of about 20° C., it is desirable to have some adsorbed water in the materials being treated, i.e. water which is removable by heating to 110° C., for example from about 0.1 to 1.0 percent by weight of the material being treated. In such a method of operating, water will require to be added before starting the process in the event of there not being any adsorbed water present in the material.

The pressure applied during the whole or part of the treating process may vary widely, for example, up to 500 p.s.i. Pressures of from 40 to 80 p.s.i. are, in geenral, suitable and convenient.

Our invention is particularly advantageous in the treatment of reinforcing silica filers as used in organopolysiloxane elastomer-forming compositions. Thus, such composition having incorporated these silicas can be easily worked after periods of six or more months. Using silicas treated by the hitherto available methods, working is difficult after about two weeks and in many cases after forty eight hours. These comparisons are of compositions not containing any added structure control agents. Thus, the treated materials of our invention are useful as constituents of elastomer-forming organopolysiloxane compositions containing no structure control agent.

Our invention is further illustrated by the following examples in which all parts and percentages are by weigth.

The merits of the products prepared as described in the examples were assessed by making up gum stocks suitable for elastomer-forming compositions containing the treated material and measuring the freshening time of the stocks. The stocks were made by milling together 50 parts of treated filler and 100 parts of a diorganopolysiloxane of average molecular weight about 750,000, and consisting essentially of dimethylsiloxanyl units and having about 0.2 mole percent methyl vinyl siloxanyl units.

The freshening time test was carried out using a differential two-roll mill, the rolls being of diameter 4 inches, the speed ratio being 1.25 to 1.00 and the faster roll rotating at about 30 r.p.m. The clearance between rolls was 0.15 inch and the guides were fixed 4 inches apart. 150 g. of stock were used in each test, the freshening time being the time for all the stock to be transferred to the fast roll.

EXAMPLE 1

(A) 200 g. of octamethylcyclotetrasiloxane were added to 1000 g. of a fume silica having a surface area of about 200 m.$^2$/g. and average particle size 10–40 m$\mu$ and an adsorbed water content of 0.6 percent in a pressure vessel of 25 litres capacity. The vessel was purged with ammonia and the mixture pressurised with ammonia to 20 lb./in.$^2$ at 20° C. This is equivalent to about 0.25 mole ammonia per 100 parts by weight of silica. The mixture was heated at 150° C. for 5 hours, after which the vessel was opened and the contents heated at 150° C. for 8 hours in a stream of nitrogen. The treated silica so obtained, which had excellent flow properties, was completely hydrophobic and had a siloxane content of about 5 percent. This filler was not structure inducing as shown by the freshening time test described above.

An elastomer was made by adding 0.4 part of a 6 percent cerium octoate solution, 5 parts of a structure control agent and 1.6 parts of a 40 percent mixture of dichlorobenzoyl peroxide in a liquid silicone to 150 parts of the filled gum stock used in the freshening time test. This composition was cured by heating for 10 minutes at 115° C. followed by one hour at 150° C. and 24 hours at 250° C. The freshening time of the filled gum stock after 2 weeks storage and the physical properties of the fully cured elastomer are shown in Tables 1 and 2 below.

(B) For purposes of comparison, 100 parts of the same fume silica were treated with 20 parts of octamethylcyclotetrasiloxane for 5 hours at 250° C. under reflux in a nitrogen atmosphere at atmospheric pressure. The mixture was heated for a further 8 hours in a stream of nitrogen to remove excess siloxane content of about 5 percent. The freshening time of a filled gum stock of the same composition as given in A above and the physical properties of the cured elastomer made therefrom are shown in Tables 1 and 2 below.

EXAMPLE 2

The process of Example 1 was repeated using the same fume silica which had previously been dried by heating at 150° C. for 16 hours. The treated silica so obtained was completely hydrophobic. The freshening time of filled gum stock and the physical properties of a cured elastomer produced by the process described in Example 1 are shown in Tables 1 and 2 below. This example illustrates the fact that the presence of free or adsorbed water is not essential to treatment.

EXAMPLE 3

20 parts of octamethylcyclotetrasiloxane were added to 100 parts by weight of the fume silica used in Example 1 in each of five vessels (a) to (e). Each vessel was purged with ammonia.

(a) Was closed, pressurised to 5 lb./in.$^2$ then heated for 8 hours at 60° C. followed by 5 hours at 150° C. Ammonia was removed by heating at 150° C. in a stream of nitrogen for 8 hours.

(b) The process of (a) was repeated without the intermediate heating at 60° C.

(c) The process of (a) was repeated with intermediate heating for 8 hours at 90° C.

(d) The process of (a) was repeated with intermediate heating for 8 hours at 110° C.

(e) The mixture of siloxane and silica was heated as in (a) but the vessel was not closed and a continuous slow stream of ammonia was passed through.

The heated silicas prepared in each manner were all completely hydrophobis.

The freshening times of filled gum stock and the physical properties of cured elastomers made from each stock by the method of Example 1 are shown in Tables 1 and 2. The silica prepared as in (a) was not structure inducing, (b), (c) and (d) caused some slight structuring, whilst stock from (e) was noticeably more structured. This example shows the importance of heating under pressure on the results obtained.

EXAMPLE 4

The process of Example 1(A) was repeated using a fume silica of surface area about 400 m.$^2$/g. and average particle size 3–15 m$\mu$. The treated filler was not structure inducing and was completely hydrophobic. The freshening time of filled gum stock and the physical properties of cured elastomer made by the method described in Example 1 are shown in Tables 1 and 2 below.

EXAMPLE 5

To three vessels (a), (b) and (c) each containing 100 parts of a fume silica having a surface area of about 200 m.$^2$/g. there were added:

(a) 20 parts of 1,3,5,7 - tetramethyl - 1,3,5,7-tetravinylcyclotetrasiloxane.

(b) 18 parts of octamethylcyclotetrasiloxane and 2 parts of 1,3,5,7 - tetramethyl - 1,3,5,7 - tetravinylcyclotetrasiloxane.

(c) 19.3 parts of octamethylcyclotetrasiloxane and 0.7 part of 1,3,5,7-tetramethyl-1,3,5,7-tetravinylcyclotetrasiloxane.

The vessels were purged with ammonia then sealed and pressurised with ammonia to 20 lb./in.$^2$ at 20° C. then heated for 5 hours at 150° C. Ammonia was removed by heating in a stream of nitrogen for 8 hours at 150° C. These fillers were not structure inducing and were completely hydrophobic. Filled gum stocks were made and freshening times are shown in Table 1 below.

EXAMPLE 6

To 100 parts by weight of a ground quartz having a particle size of about 5 microns contained in a pressure vessel there were added 4 parts of octamethylcyclotetrasiloxane. After purging with ammonia, the vessel was sealed and pressurised to 20 p.s.i. with ammonia then heated for 5 hours at 150° C. The so treated filler was hydrophobic.

Table 1

Freshening time of compositions made from 100 parts methylvinylpolysiloxane gum and 50 parts treated filler after 2 weeks storage except where otherwise stated.

| Examples: | Freshening time (seconds) |
|---|---|
| 1(A) | <20 |
| 1(B) (control) | >300 |
| 1(B( (control) (1 day storage) | 200 |
| 2 | 30 |
| 3(a) | <20 |
| 3(b) | 105 |
| 3(c) | 40 |
| 3(d) | 80 |
| 3(e) | 210 |
| 4 | <30 |
| 5(a) | <20 |
| 5(b) | <20 |
| 5(c) | <20 |
| 6 | <20 |

Table 2

Physical properties of elastomers formed from compositions containing cerium octoate and a structure control agent as described in Example 1.

| Example | Hardness, ° BS [1] | Elongation at break [2] (percent) | Tensile strength, p.s.i.[3] | Tear strength (lb./in.) [4] |
|---|---|---|---|---|
| 1A | 60 | 400 | 1,190 | 12.5 |
| 1B | 67 | 300 | 1,240 | 8.3 |
| 2 | 58 | 420 | 1,020 | 12.9 |
| 3a | 61 | 470 | 1,240 | 16.8 |
| 3b | 63 | 410 | 1,250 | 11.5 |
| 3c | 57 | 460 | 1,310 | 14.5 |
| 3d | 61 | 425 | 1,160 | 13.3 |
| 3e | 63 | 390 | 1,050 | 12.1 |
| 4 | 72 | 310 | 1,380 | 16.5 |

[1] According to B.S. 903, A7:1957.
[2] According to B.S. 903, A2:1956.
[3] Accroding to B.S. 903, A2:1956.
[4] According to B.S. 903, A3:1956.

EXAMPLE 7

To 100 parts of the fume silica used in Example 1 in separated vessels were added:

(a) 20 parts of hexamethyldisiloxane
(b) 20 parts of octamethyltrisiloxane
(c) 20 parts of decamethyltetrasiloxane
(d) 20 parts of dodecamethylpentasiloxane
(e) 10 parts of octamethylcyclotetrasiloxane
(f) 7.5 parts of octamethylcyclotetrasiloxane
(g) 5 parts of octamethylcyclotetrasiloxane.

The vessels were purged with ammonia and sealed, after which the process of Example 1 was carried out. The freshening times of the filled gum stocks after 2 weeks storage and the properties of the cured elastomers produced by the process described in Example 1 are shown below.

| | | Elastomer properties after cure of 4 hours at 200° C. | | | |
|---|---|---|---|---|---|
| Example | Freshening time (seconds) | Hardness, ° BS | Elongation at break (percent) | Tensile strength (p.s.i.) | Tear strength (lb./in.) |
| 7(a) | 20 | 55 | 315 | 1,230 | 17.1 |
| 7(b) | <20 | 49 | 580 | 1,160 | 16.7 |
| 7(c) | <20 | 55 | 620 | 1,260 | 21.2 |
| 7(d) | 30 | 49 | 585 | 1,290 | 20.6 |
| 7(e) | 35 | 58 | 300 | 1,230 | 16.0 |
| 7(f) | 75 | 60 | 340 | 1,390 | 15.8 |
| 7(g) | 120 | 72 | 395 | 1,320 | 14.5 |

EXAMPLE 8

20 parts of sym-divinyltetramethyldisiloxane were dried to 100 parts of the fume silica used in Example 1 and the process of ammonia pressure treatment of Example 1 carried out on the mixture. The treated filler was hydrophobic and a filled gum stock freshened in less than 30 seconds after storage for 2 weeks.

EXAMPLE 9

20 parts of octamethylcyclotetrasiloxane were added to each of 6 portions of 100 parts of the fume silica used in Example 1. The following amino compounds were added each to one of the mixtures so obtained:

(a) No amino compound;
(b) 25 percent aqueous methylamine solution equivalent to 0.02 mole methylamine per 100 g. of silica;
(c) 25 percent aqueous trimethylamine solution equivalent to 0.02 mole of trimethylamine per 10 g. of silica;
(d) 0.02 mole of n-butylamine per 100 g. of silica;
(e) 0.02 mole of ethylenediamine per 100 g. of silica;
(f) 25 percent aqueous methylamine solution equivalent to 0.005 mole of methylamine per 100 g. of silica.

In each case the pressure vessels were sealed and heated for 5 hours at 150° C. The amino compound was removed by purging with nitrogen at 150° C. for 8 hours. The freshening time of the filled gum stocks after 2 weeks storage and the properties of the cured elastomers produced by the process of Example 1 are shown below. Filler from Example (a) was hydrophilic; the others were hydrophobic.

| Example | Freshening time (seconds) | Elastomer properties after cure of 4 hours at 200° C. | | | |
|---|---|---|---|---|---|
| | | Hardness, °BS | Elongation at break (percent) | Tensile strength (p.s.i.) | Tear strength (lb./in.) |
| 9(a) | (¹) | | | | |
| 9(b) | 20 | 61 | 500 | 1,180 | 12.0 |
| 9(c) | 50 | 62 | 420 | 960 | 12.7 |
| 9(d) | 80 | 59 | 560 | 1,250 | 10.0 |
| 9(e) | 70 | 51 | 715 | 1,250 | 12.6 |
| 9(f) | 70 | | | | |

¹ Structured.

EXAMPLE 10

20 parts of octamethylcyclotetrasiloxane were added up to 100 parts each of (a) "Celite" S/F, (b) "Santocel" CS and (c) "Hi-Sil" 233 and each mixture given the ammonia pressure treatment as described in Example 1. The treated fillers were hydrophobic and filled gum stocks made from each were freshened in less than 30 seconds after a 2 week storage period. ("Celite," "Santocel" and "Hi-Sil" are registered trademarks).

EXAMPLE 11

100 parts of each of the following pigments (a) Fuller's earth, "Fulmont" (registered trademark) 300C
(b) Alumina Grade H (as sold by Laporte Chemicals Limited)
(c) Talc
(d) Kieselguhr
(e) Titanium dioxide
(f) Magnesium oxide were treated with 20 parts of octamethylcyclotetrasiloxane and each was given the ammonia pressure treatment as described in Example 1. The treated powders were free-flowing, did not adhere to glass and were hydrophobic.

EXAMPLE 12

100 parts of the fume silica used in Example 1 in each of three vessels were treated with 20 parts of octamethylcyclotetrasiloxane and the three treated with 5 parts of (a) ammonium carbonate,
(b) ammonium chloride, and
(c) aqueous solution ammonium hydroxide (S.G. 0.88) respectively.

The vessels were sealed and heated for 5 hours at 150° C. Excess amino compound and siloxane were removed by heating in an air circulating oven at 150° C. for 16 hours. The treated fillers were hydrophobic. After 2 weeks storage, filled gum stocks freshened in less than 30 seconds with filler from (a) and (b) and in 70 seconds with filler from (c).

EXAMPLE 13

100 parts of the fume silica used in Example 1 in each of three vessels were treated with 20 parts of octamethylcyclotetrasiloxane and each was pressurised with ammonia to 20 p.s.i. at 20° C. They were then heated under the following conditions (a) 3 hours at 250° C.,
(b) 9 hours at 90° C., and
(c) 18 hours at 60° C. respectively The vessels were depressurised and excess ammonia and siloxane removed by purging with nitrogen at 150° C. for 8 hours. Filled gum stocks after two weeks storage had the following freshening times:

(a) 40 seconds; (b) <30 seconds; (c) <20 seconds.

EXAMPLE 14

10 parts of a hydroxy-ended dimethylpolysiloxane consisting mainly of a mixture of siloxanes having 4 to 6 silicon atoms and of viscosity 31.2 cP. at 25° C. and a hydroxyl content of 7.6 percent were added to 100 parts of the fumes silica used in Example 1. The treated silica was given an ammonia pressure treatment by the process described in Example 1, after which excess ammonia and siloxane were removed at 150° C. by purging with nitrogen for 8 hours. A filled gum stock made from this treated filler and stored for 2 weeks at room temperature was freshened in less than 20 seconds.

EXAMPLE 15

20 parts of sym-trimethyltriphenylcyclotrisiloxane were added to 100 parts of the fume silica used in Example 1 and the ammonia pressure treatment process of Example 1 was given to the mixture. The treated filler so obtained was hydrophobic.

What I claim is:

1. A process for rendering finely divided fillers, pigments and like materials hydrophobic and non-structure inducing when used in organopolysiloxane elastomer-forming compositions comprising intimately admixing said material with an organopolysiloxane selected from the group consisting of hexamethyldisiloxane, symmetrical divinyltetramethyldisiloxane, octamethylcyclotetrasiloxane and tetramethyltetravinylcyclotetrasiloxane in amount from about 5 to about 20% by weight, the process being carried out at from 60 to 300° C. and under an ammonia pressure of 5 to 500 p.s.i. for from 1 to 24 hours.

2. A process according to claim 1 wherein the material to be treated is selected from the group consisting of asbestos, fullers earth, talc, diatomaceous earths, ground quartz, precipitated silicas, silica aerogels, fume silicas, alumina, red iron oxide, magnesium oxide and titanium dioxide.

3. A process according to claim 1 wherein the surface area of the material to be treated is from 20 to 1000 m.²/g.

4. A process according to claim 1 wherein the ammonia pressure is from about 20 to about 500 lb./in.².

5. A process according to claim 1 wherein the material to be treated is first mixed with the organopolysiloxane and the mixture then maintained for from about 8 to about 48 hours at a temperature of from about 20 to about 60° C. in an atmosphere of ammonia, pressurised with ammonia to from about 5 to about 25 lb./in.² and finally heated for from about 1 to about 12 hours at a temperature of from about 100 to about 300° C.

6. Finely divided fillers, pigments and like materials rendered hydrophobic and non-structure inducing when used in organopolysiloxane elastomer-forming compositions whenever produced by a process as claimed in claim 1.

7. Organopolysiloxane elastomer-forming compositions having incorporated therein a filler, pigment or like material as claimed in claim 6.

References Cited

UNITED STATES PATENTS 3,334,062  8/1967  Brown et al. _____ 260—37 SB
3,464,945  9/1969  Martellock _____ 260—37 SB X LEWIS T. JACOBS, Assistant Examiner U.S. Cl. X.R.

106—308 Q